United States Patent
Lee

[15] 3,637,019
[45] Jan. 25, 1972

[54] METHOD FOR PLUGGING A POROUS STRATUM PENETRATED BY A WELLBORE

[72] Inventor: Jimmy D. Lee, Houston, Tex.
[73] Assignee: Dalton E. Bloom, Houston, Tex. a part interest
[22] Filed: Mar. 16, 1970
[21] Appl. No.: 19,977

[52] U.S. Cl. ............................................................166/295
[51] Int. Cl. ......................................................E21b 33/138
[58] Field of Search ..................175/72, 69, 71, 65; 166/295, 166/282, 283, 300, 309, 294, 293, 292

[56] References Cited

UNITED STATES PATENTS

| | | | |
|---|---|---|---|
| 2,761,511 | 9/1956 | Billue | 166/292 |
| 3,141,513 | 7/1964 | Davis | 166/295 |
| 3,181,611 | 5/1965 | Dollarhide | 166/295 |
| 3,181,612 | 5/1965 | West et al. | 166/295 X |
| 3,379,253 | 4/1968 | Chism | 166/295 |
| 3,308,884 | 3/1967 | Robichaux | 166/295 |
| 3,470,957 | 10/1969 | Hamilton | 166/295 |
| 3,456,735 | 7/1969 | McDougall et al. | 166/295 UX |

Primary Examiner—Stephen J. Novosad
Attorney—Paul E. Harris and Lee R. Larkin

[57] ABSTRACT

The apparatus includes a mixing head forming a mixing chamber communicating with the wellbore, with the chamber having baffle means therein for creating turbulence as fluids are flowed therethrough. The mixing head is arranged for insertion into the wellbore to a position generally adjacent to the porous stratum. Three conduit means are arranged to extend down the wellbore to the mixing head for conducting A and B components of polyurethane and a mixing gas such as air. Means are provided for forcing the components and gas down the conduits to the mixing chamber at predetermined pressures and volumes whereby the components are mixed in the mixing chamber by the turbulence created by the gas and baffle means, and the mixing chamber is maintained clear of hardened polyurethane by the flow of the gas or fluid therethrough. After the polyurethane which has been deposited in the wellbore has set up, it may thereafter be drilled through, with the hardened polyurethane consolidating the lost circulation zone adjacent the wellbore.

5 Claims, 3 Drawing Figures

PATENTED JAN25 1972

3,637,019

Jimmy D. Lee
INVENTOR.

BY Lee R. Larkin
ATTORNEY

METHOD FOR PLUGGING A POROUS STRATUM PENETRATED BY A WELLBORE

BACKGROUND OF THE INVENTION

1. Field of the Invention

This invention relates to an apparatus and method for plugging a porous stratum penetrated by a wellbore with a hardened foam. More particularly, this invention relates to an apparatus and method for plugging a porous stratum penetrated by a wellbore using a foam produced by two components which are mixed by a gas, such as air, in a mixing chamber.

2. Description of the Prior Art

Many methods and apparatuses have been proposed for plugging porous strata in a wellbore which strata may be susceptible to loss of circulation during drilling operations. These strata are sometimes referred to as vugged or porous strata. One prior art method contemplates the introduction of a liquid solidifiable substance together with a gas or gas-producing substance into the formation, with the gas being used to drive the solidifiable substance into the formation. However, this system does not always work satisfactorily because of inadequate mixing of the gas and substance to produce a desirable foam structure.

Another method contemplates the injection of a liquid resin which is arranged to harden after a period of time. However, in this instance a foam with he desired characteristics is usually not obtained. Still another system contemplates premixing the polyurethane components at the well head and thereafter pumping the same downward to the porous formation. However, the foam in this instance is quite likely to set up during the pumping operation and result in clogging of the conduits through which the foam is pumped. Another method contemplates mixing the components of the polyurethane by spraying the two components so as to impinge together, such that a foam is produced in the wellbore adjacent the porous formation. However, in this instance it is difficult to control the spraying operation such that there is uniform mixing of the components and full utilization of the components to produce the desired amount of foam. Still another method contemplates dropping of the chemicals which are to produce the foam into the wellbore in containers, which containers break upon reaching the bottom of the wellbore and result in mixing of the chemical components. This system is obviously inadequate to assure proper mixing of the chemicals or polyurethane components to assure the development of a proper foam structure. U.S. Pat. No. 3,379,253, is generally illustrative of the prior art.

SUMMARY OF THE INVENTION

It is therefore an object of this invention to provide an improved method and apparatus for plugging a porous stratum penetrated by a wellbore by the production and utilization of a foam, such as polyurethane.

In carrying out the method, a first component comprising a diisocyanate is introduced into a mixing zone generally adjacent to the porous stratum in the wellbore. There is simultaneously introduced into the mixing zone a second component comprising a foam-producing resin of the type which will react with the first component to produce a foam which will cure to a hardened state. Air is injected into the mixing zone to create turbulence and mixing of the components, whereby the components react to produce a foam and the air forces the foam out of the mixing zone. Production of the foam is continued in this manner until an interval of the wellbore and the pores of the porous stratum adjacent the wellbore are filled with the foam. The foam is then allowed to cure to a hardened state, after which it is drilled through by conventional drilling means, whereby the porous stratum remains plugged by the hardened foam.

In carrying out the method, the ratio of the first and second components is preferably in the range of about 1:1 on a volume basis. Preferably the resin includes a polyether having a hydroxyl number of about 300 to 550.

The apparatus of this invention includes a mixing head forming a mixing chamber communicating with the wellbore. The chamber of the mixing head has baffle means therein for creating turbulence as fluid is flowed therethrough, with the mixing head being arranged for insertion into the wellbore to a position generally adjacent to porous stratum. It includes a first conduit extending down the wellbore and discharging into the mixing chamber for flowing a first component thereto. A second conduit is provided which extends down the wellbore to the mixing chamber for flowing a second component of the type which will react with the first component to produce a stable foam. A third conduit is included which extends down the wellbore and is arranged to discharge into the mixing chamber for flowing a gas, such as air, therethrough. Weight means attached to the mixing head may also be provided to assist in forcing the mixing head and conduits downward through the drilling fluid in the wellbore. Means, such as pump means, are provided for forcing the components and the air down the conduits to the mixing chamber at predetermined pressures and volumes, whereby the components are mixed in the mixing chamber by the turbulence created by the gas and the baffle means to thereby create a quantity of stable foam in the wellbore.

Preferably the mixing head and conduit are sized for passage downward through a pipe suspended in the wellbore. However, any size mixing head and conduit smaller in diameter than the wellbore may be utilized if the apparatus is to be used in a wellbore without a pipe suspended therein. In either size, the conduits are arranged for connection to the upper end of the mixing head, with the foam being discharged from the lower end thereof, whereby the flow of gas prevents buildup of hardened foam in the chamber and also creates turbulence for mixing of the components.

BRIEF DESCRIPTION OF THE DRAWINGS

Reference to the drawing will further explain the invention wherein.

DESCRIPTION OF THE PREFERRED EMBODIMENT

Figure 1:
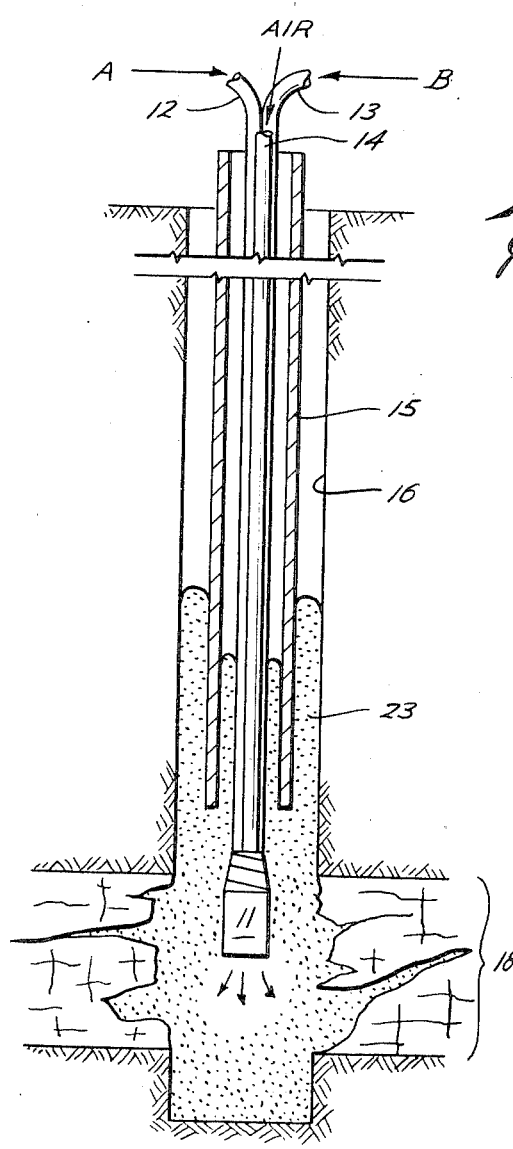
FIG. 1 is generally a central vertical sectional view of one apparatus embodiment of the invention shown suspended in a wellbore.

The apparatus of this invention for producing foam for plugging a porous stratum penetrated by a wellbore includes a number of elements in combination including a mixing head 11 which is suspended at the lower end of three flexible hoses 12, 13 and 14. Mixing head 11 and hoses 12, 13 and 14 may be arranged to pass downwardly through tubing or drill stem 15 which has the drill bit removed therefrom, or may be of any diameter less than the inside diameter of the wellbore if the apparatus is to be used in a wellbore having the drilling stem removed therefrom. FIG. 1 illustrates the former embodiment with drill stem 15 shown with the drill bit removed and suspended in the wellbore 16. In this embodiment, mixing head 11 is sized such that it can be lowered through the inside of drill stem 15 as shown. In either embodiment, it is also desirable that hoses 12, 13 and 14 and mixing head 11 be of a drillable material, such as rubber or plastic or the like to insure the drillability thereof in the event that the same is lost in the wellbore.

In either of the foregoing embodiments, the apparatus of this invention may also include deformable packer means (not shown) secured to the apparatus adjacent the upper end of the mixing head and arranged to effectuate a pressuretight seal between the apparatus and the wellbore. This packer means may conveniently take the form of an inflatable bag or bladder secured to hoses 12, 13 and 14 above mixing head 11 or secured to mixing head 11 and connected to the surface through a pressure hose (not shown). This inflatable packer may be of any convenient form, such as an annular elastomeric bag.

In carrying out the invention it is desirable that mixing head 11 be suspended generally adjacent the area of the lost circulation such as lost circulation zone 18, as shown in FIG. 1.

Figure 3:
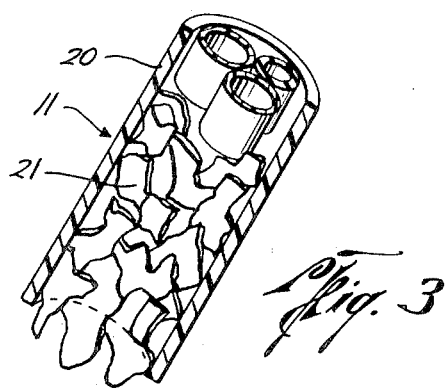
FIG. 3 is a fragmentary generally central sectional view of one embodiment of the mixing head of this invention.

Hoses 12, 13 and 14 are arranged to discharge in the upper end of mixing head 11 which is generally comprised of an external rubber tube 20 having a generally helical metal baffle 21 therein, whereby the components which are to be mixed are introduced into the upper portion of tube 20 and the mixed components producing the foam are discharged from the lower end thereof, as shown in FIG. 3.

In some instances, e.g., where the wellbore is filled with a relatively high-density drilling mud, it may be necessary to weight the apparatus to aid in lowering it into the wellbore. Any high-density weight, such as a piece of lead, may be suitably attached to mixing head 11 or to the lower end portion of hoses 12, 13 and 14 to perform this function.

In operation, one of the components for making the foam, as for example component A for making polyurethane foam, is introduced through hose 12 simultaneously with the introduction of component B through hose 13. In addition, a gas is flowed downwardly simultaneously through hose 14, which gas may be compressed air. A and B components discharge into the upper end of rubber tube 20 along with the air from hose 14. The combination of the air and the baffle means in mixing head 11 creates a great amount of turbulence which results in thorough mixing of the A and B components which produces the polyurethane foam. The air which is supplied through hose 14 may be from any convenient source which is generally available on the drilling rig. The A and B components are pumped down hoses 12 and 13 by conventional means such as a dual metering pump for precisely controlling the quantities of each of the components pumped down the wellbore.

In operation, when the driller notes a loss of drilling fluid from the wellbore, this generally signifies that the drill bit has penetrated a porous formation. The driller thereafter removes the drill stem from the wellbore and removes the bit from the drill stem. Thereafter, the apparatus of this invention may be lowered directly into the wellbore or the drill stem or some other tubing may be run back down into the well into the position shown in FIG. 1. Thereafter, mixing head 11 and hoses 12, 13 and 14 are lowered through the wellbore (or through drill stem 15 in the wellbore, as shown in FIG. 1), until the mixing head is located generally adjacent the lost circulation zone 18. If the apparatus is provided with an inflatable packer, this packer would then be inflated with sufficient pressure to effectuate a pressuretight seal between the apparatus and the wellbore.

Thereafter hose 14 is connected to an air supply and hoses 12 and 13 are connected to a pump which pumps the A and B polyurethane components down to mixing head 11 in the desired proportions. Mixing of the A and B components takes place in the mixing chamber formed by mixing head 11 and foam is discharged from the lower end thereof, as shown in FIG. 1. The baffle 21 combined with the air pressure exerted through hose 14 creates turbulence and mixing of the components and the discharge of the foam out the lower end of mixing head 11. The passage of air therethrough also clears mixing head 11 of the foam to prevent buildup of hardened foam. The production of foam is continued until the foam rises to a desired level in the borehole, and is forced outward into the pores of lost circulation zone 18, as shown. The rising of the foam, such as foam 23, forces the same back into the cracks and cavities and seals off the lost circulation zone 18.

After the foam has been deposited in the wellbore, as described above, the inflatable packer, if used, is deflated and the mixing head 11 and hoses 12, 13 and 14 are removed from the well, as is the drill stem 15, if used.

Foam 23 is allowed to set up to a hardened state, which may take from a few minutes to several hours' time, after which the drilling crew goes back into the wellbore with the conventional drilling means, including a drill stem and bit and continues the drilling operation, thereby drilling through the hardened foam 23. The residue of the hardened foam 23 which is left in the wellbore is usually sufficient to prevent the further loss of circulation to the lost circulation zone 18. If another lost circulation zone is subsequently encountered, then the process can be repeated.

It is particularly important that the mixing head 11 be maintained clear of hardened foam and this is accomplished by the introduction of air through hose 14, which also adds to the mixing action of the chemicals, along with baffle 21.

Figure 2:
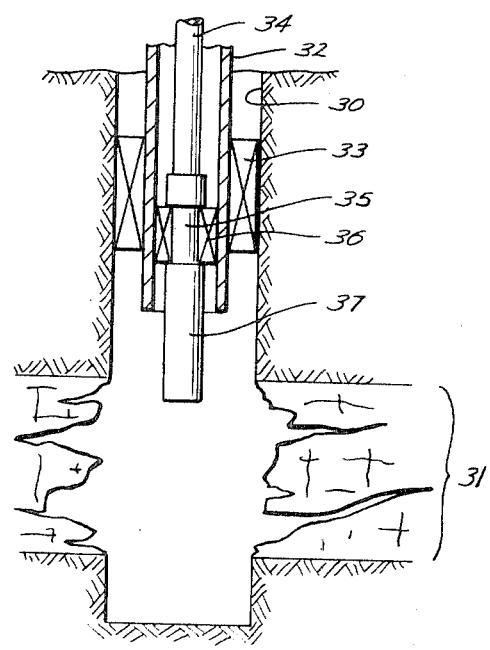
FIG. 2 is a fragmentary generally central sectional view of an alternate embodiment of the invention shown suspended in a wellbore.

Referring now to FIG. 2 an alternate embodiment of the apparatus is shown. In this embodiment the wellbore 30 is shown penetrating the lost circulation zone 31. A tubing 32 is suspended in wellbore 30 and is packed off therefrom by conventional packer 33. Tubing 32 has passing downwardly therethrough a three conduit hose 34 which is arranged for separately passing A and B components, and air separately, downwardly therethrough. Hose 34 is provided with a connector 35 on the lower end thereof which passes through internal packer 36 and discharges to mixing head 37. It is to be understood that mixing head 37 is of a similar construction with mixing head 11, shown in FIG. 1 and the operation is similar.

During the operation of the embodiment shown in FIG. 2, when lost circulation zone 31 is encountered, the drill string is removed and tubing 32 inserted in a position shown along with hose 34, connector 35 and mixing head 37 and packers 33 and 36. The A and B components of the polyurethane are flowed separately downwardly through hose 34, as with the previous embodiment. Mixing of the components occurs in mixing head 37 and the foam is discharge out the lower end thereof. Production of foam is continued until the portion of the wellbore below packer 33 is filled with foam and the foam is pressed into the plugs or pores of lost circulation zone 31. Thereafter tubing 32 and associated elements are removed from the wellbore and the foam allowed to harden, after which it is drilled through the same as with the previous embodiment.

The A and B components discussed above are of the conventional type which are normally used for the production of polyurethane foam. These components may be of the type sold by Cook Chemical Company under its trade name Cook Gold Foam bearing numbers 402 SE, which is arranged to provide two pounds per cubic foot density or higher are required. In this type of system one of the components, as for example component A, may consist of an isocyanate which comprises approximately 45 to 55 percent by volume of the total composition of the foam to be produced. The preferred type of isocyanate is diphenyl methane diisocyanate which may be reacted with a polyether polyol with the hydroxyl number of 300–550 and a fire retardant polyol if self-extinguishing properties are required.

The cross leaking or B component comprises about 45 to about 55 percent by volume of the reaction mixture and is composed of a polyether and/or polyester polyols having the aforesaid hydroxy numbers in the range of about 300–550. Component B may also include a fluorocarbon blowing agent, silicone surfactants, and amine and/or tin catalysts.

It will thus be apparent that the art has been provided with an improved apparatus and method for plugging a porous stratum penetrated by a wellbore. It is to be understood that the foregoing embodiments are to be construed as illustrative only and other alternative embodiments and variations thereof will be apparent to those skilled in the art in view of the foregoing description.

What is claimed is:

1. In a method for plugging a porous stratum penetrated by a wellbore, the combination comprising the steps of:
   introducing a first component comprising a diisocyanate into a mixing zone generally adjacent said porous stratum in said wellbore;

simultaneously introducing into said mixing zone a second component comprising a foam-producing resin of the type which will react with said first component to produce a foam which will cure to a hardened state;

injecting air into said mixing zone to create turbulence and mixing of said components, whereby said components react to produce said foam and said air forces said foam out of said mixing zone;

continuing the production of said foam until an interval of said wellbore and the pores of said stratum adjacent said wellbore are filled with foam;

and drilling through said foam after said foam has cured to a hardened state, whereby said porous stratum remains plugged by said hardened foam.

2. The invention as claimed in claim 1 wherein:
said resin includes a polyether having a hydroxyl number of about 300 to 550.

3. The invention as claimed in claim 1 wherein:
said resin includes polyester polyols having a hydroxyl number of about 300 to 550.

4. The invention as claimed in claim 1 wherein:
said first and second components and said air are separately flowed down to said mixing zone through a pipe suspended in said wellbore.

5. The invention as claimed in claim 1 wherein:
said air is introduced into said zone at a pressure in the range of about 20 to 200 p.s.i.

* * * * *